US012148253B2

(12) United States Patent
Kulandaivel et al.

(10) Patent No.: US 12,148,253 B2
(45) Date of Patent: Nov. 19, 2024

(54) SYSTEM AND METHOD TO DETECT MALICIOUS USE OF DIAGNOSTIC STATE CHANGES IN A VEHICLE (71) Applicant: Robert Bosch GmbH, Stuttgart (DE)

(72) Inventors: Sekar Kulandaivel, Silver Spring, MD (US); Shalabh Jain, Pittsburgh, PA (US); Jan Holle, Stuttgart (DE)

(73) Assignee: Robert Bosch GmbH (DE)

( * ) Notice: Subject to any disclaimer, the term of this patent is extended or adjusted under 35 U.S.C. 154(b) by 468 days.

(21) Appl. No.: 17/412,822

(22) Filed: Aug. 26, 2021

(65) Prior Publication Data

US 2023/0064153 A1  Mar. 2, 2023

(51) Int. Cl.
*G07C 5/08* (2006.01)
*H04L 12/40* (2006.01)
*H04W 12/122* (2021.01)

(52) U.S. Cl.
CPC ......... *G07C 5/0808* (2013.01); *G07C 5/0816* (2013.01); *H04L 12/40* (2013.01); *H04W 12/122* (2021.01); *H04L 2012/40215* (2013.01)

(58) Field of Classification Search
None
See application file for complete search history.

(56) References Cited

U.S. PATENT DOCUMENTS

| 6,269,246 | B1* | 7/2001 | Rao | G01S 5/02521 |
| | | | | 455/456.3 |
| 8,296,842 | B2* | 10/2012 | Singh | G06F 21/55 |
| | | | | 713/153 |
| 8,689,333 | B2* | 4/2014 | Aziz | H04L 63/1491 |
| | | | | 726/24 |
| 10,148,606 | B2* | 12/2018 | Jeyaraman | H04L 51/52 |
| 11,273,841 | B2* | 3/2022 | Goldman | G01S 17/10 |
| 2008/0307524 | A1* | 12/2008 | Singh | H04L 63/1416 |
| | | | | 726/22 |
| 2009/0138136 | A1 | 5/2009 | Natsume | |
| 2013/0111582 | A1 | 5/2013 | Forest | |

(Continued)

FOREIGN PATENT DOCUMENTS

CN    1870025 A  * 11/2006
EP    3814961 A1 *  5/2021   ........... G06F 21/566

(Continued)

OTHER PUBLICATIONS

Miller, Charlie, and Chris Valasek. "Remote exploitation of an unaltered passenger vehicle." Black Hat USA 2015.S 91 (2015), 91 pages.

*Primary Examiner* — Jean Paul Cass
(74) *Attorney, Agent, or Firm* — Dickinson Wright PLLC (57) ABSTRACT A computer-implement method includes receiving one or more messages at a secure processor from a first node on a communication bus, monitoring the one or more messages from the first node, wherein the one or more messages include a request to a change a state of the one or more nodes, in response to the one or more messages including the request to the change of state, initiating a timer to initiate monitoring of the communication bus for a second sequence of messages, and in response to the second sequence of messages not being found within a database including information associated with the one or more latency values associated with the change of state, outputting a signal indicating an alert.

17 Claims, 5 Drawing Sheets

(56) References Cited

U.S. PATENT DOCUMENTS

| | | | |
|---|---|---|---|
| 2014/0089243 A1* | 3/2014 | Oppenheimer | H04L 67/12 |
| | | | 706/46 |
| 2015/0166010 A1 | 6/2015 | Kyung | |
| 2017/0169208 A1* | 6/2017 | Jantz | G06F 21/44 |
| 2017/0286675 A1* | 10/2017 | Shin | H04L 63/1416 |
| 2018/0352376 A1* | 12/2018 | Shuman | G06F 16/29 |
| 2021/0192867 A1 | 6/2021 | Fang et al. | |

FOREIGN PATENT DOCUMENTS

| | | | | |
|---|---|---|---|---|
| JP | 4459194 B2 * | 4/2010 | | G03F 7/70691 |
| KR | 20210075458 A | 6/2021 | | |

* cited by examiner

SYSTEM AND METHOD TO DETECT MALICIOUS USE OF DIAGNOSTIC STATE CHANGES IN A VEHICLE

TECHNICAL FIELD

The present disclosure relates to security of a computer system, such as a vehicle computer system or other type of system.

BACKGROUND

Modern automotive in-vehicle networks present a large attack surface from a security point of view, due to both the amount of Electrical Control Units (ECUs) and their connectivity to external networks. Detecting a malicious intrusion into such networks is an integral part of automotive security to prevent or at least lower the impact of attacks.

SUMMARY

In a first embodiment, a system includes a memory, a database including information indicating one or more latency values associated with a change of state associated with one or more nodes on communication bus, wherein the database further includes information indicating one or more messages configured to change a state of the one or more nodes, and a secure processor in communication with the memory. The secure processor is programmed to monitor one or more messages from a first node on the communication bus, wherein the one or more messages include a request to a state change of the one or more nodes, in response to the one or more messages including the request to the state change, initiate a timer to initiate monitoring of the communication bus for a second sequence of messages, and in response to the second sequence of messages not being aligned with a database indicating packet information associated with one or more latency values associated with the change of state, output a signal indicating an alert.

In a second embodiment, a computer-implement method includes receiving one or more messages at a processor from a first node on a communication bus, monitoring the one or more messages from the first node, wherein the one or more messages include a request to a change a state of the one or more nodes, in response to the one or more messages including the request to the change of state, initiating a timer to initiate monitoring of the communication bus for a second sequence of messages, and in response to the second sequence of messages not being found within a database including information associated with the one or more latency values associated with the change of state, outputting a signal indicating an alert.

In a third embodiment, a system includes a secure processor in communication with memory on a communication bus and programmed to receive one or more messages at a secure processor from a first node on a communication bus, monitor the one or more messages from the first node, wherein the one or more messages include a request to change the state of the one or more nodes. The processor is further programmed to, in response to the one or more messages including the request to change the state, monitor the communication bus for a second sequence of messages, and in response to the second sequence of messages not being aligned with packet information associated with the request to change the state of the one or more nodes, output a signal indicating an alert.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In-vehicle automotive networks that employ the Controller Area Network (CAN) protocol may be vulnerable to attacks from compromised ECUs that are remotely controlled by an adversary. Additionally, these remote adversaries can exploit the Unified Diagnostic Services (UDS) protocol, which is an application built on top of CAN, to launch more safety-critical attacks. To combat this, Intrusion Detection Systems (IDS) have been implemented to detect these types of attacks. A popular choice of IDS implementation is the rules-based IDS, which defines a set of rules that the network traffic must follow in relation to message frequency, content, and context. For the UDS protocol, rules-based IDS implement special rules to keep track of the different session types that UDS enables.

As described further below, two vulnerabilities may cause a rules-based IDS to become vulnerable to spoofed messages on the network and lose track of the session state for the ECUs in a vehicle. As a solution, the system may identify new methods to enhance the detection capabilities of a rules-based IDS. These methods do not require additional hardware as a rules-based IDS is often chosen for its existence as only software and for its ability to operate on an existing ECU. While these new methods can be added to a rules-based IDS, they can also support other types of IDSs or other defenses by identifying two unexpected results for real UDS implementations.

CAN bus is the central communication network in several modern systems such as automotive systems, aerospace systems and industrial systems. The addition of remote interfaces to some nodes on the bus has opened these systems to remote attacks. These attacks have been repeatedly demonstrated on passenger vehicles by several security researchers. Thus, improving security of the CAN bus has become an important area of research over the past decade.

To permit diagnostic access for authorized service technicians, vehicle manufacturers implement a protocol called Unified Diagnostics Service (UDS) that defines both a session and application layer according to ISO-14229. The UDS protocol supports a variety of applications for the service technician (e.g. controlling ECU test parameters, reading error and diagnostic codes), but these applications are only available if the correct UDS session has been established. In general, there are four main UDS session types: default, programming, extended diagnostic, and safety diagnostic. The default session only permits access to a specific set of UDS services while the other sessions allow access to other sets of services (e.g. programming session allows access to security authentication, extended diagnostic allows access to more critical component testing, safety diagnostic allows access to airbag testing).

While the UDS services are intended to be used by service technicians, remote attackers can make use of these services as well. One may have exploited an ECU inside a real vehicle and used that ECU's access to the CAN bus to launch attacks on the in-vehicle network. These attacks included communication over the CAN bus with regular CAN messages and with UDS messages (which operate over CAN). Their UDS-based attacks included engaging the brakes, kill the brakes, shutting off lights, killing the engine, engaging the seat belt motor, etc.

As a defense against this evolving threat landscape, researchers have proposed a variety of techniques, including message authentication, intrusion detection systems (IDSes), and secure CAN hardware solutions. Of these solutions, using an IDS is a common choice as it does not require a complete revamp of network communication (as is the case of message authentication) and does not requires changes to the hardware (as is the case of secure CAN hardware solutions). While there are multiple approaches to building an IDS, a popular choice is the rules-based IDS, where the automaker defines a set of rules that the network traffic must follow, or the IDS will trigger an alert. These rules will define the expected frequency, content, and context for every message that should appear on the network. By fine-tuning these rules with sufficient testing, an IDS can prove useful for detecting the malicious compromise of an in-vehicle ECU and its attempt to disrupt the network.

Although a rules-based IDS can be tailored to fit any specific vehicle and is less costly to implement since it does not require additional hardware, a major limitation of this approach is the requirement of defining effective rules. Message sequences not covered by rules could be exploited by an attacker to avoid detection by the IDS. As disclosed below, a system may be configured to identify rules that have not been identified previously and could enable an attack that might not be detected by a rules-based IDS. In a first example, a vulnerability originates from an experimental observation when performing a hard reset (a UDS command available to all nodes in the network). In such an example, after a hard reset, there is a short but significant period of time where the reset ECU will be "blind" to network traffic and not communicate with other ECU's on the communication bus. Another vulnerability may be that repeated requests to change between session types can result in a desynchronization between the actual session type of a given ECU and the session type of said ECU as determined by a rules-based IDS. To defend against these two vulnerabilities, the system can propose new sets of rules as well as other countermeasures to detect or prevent these vulnerabilities.

Figure 1:
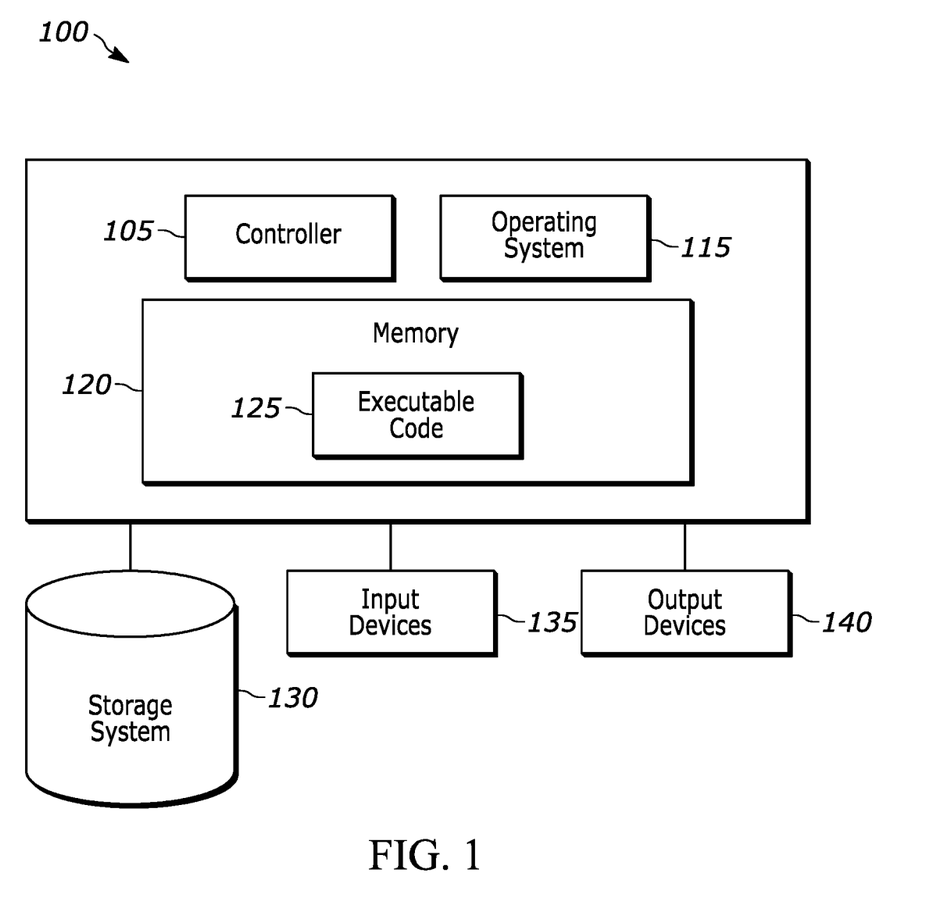
FIG. 1 illustrates a block diagram of an exemplary computing device, according to some embodiments of the disclosure.

As shown in FIG. 1, which shows a block diagram of an exemplary computing device, according to some embodiments of the disclosure. A device 100 may include a controller 105 that may be, for example, a central processing unit (CPU), a chip or any suitable computing or computational device, an operating system 115, a memory 120, executable code 125, a storage system 130 that may include input devices 135 and output devices 140. Controller 105 (or one or more controllers or processors, possibly across multiple units or devices) may be configured to carry out methods described herein, and/or to execute or act as the various modules, units, etc. More than one computing device 100 may be included in, and one or more computing devices 100 may act as the components of, a system according to embodiments of the invention.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or tasks or enabling software programs or other modules or units to communicate. Operating system 115 may be a commercial operating system. It will be noted that an operating system 115 may be an optional component, e.g., in some embodiments, a system may include a computing device that does not require or include an operating system 115. For example, a computer system may be, or may include, a microcontroller, an application specific circuit (ASIC), a field programmable array (FPGA), network controller (e.g., CAN bus controller), associated transceiver, system on a chip (SOC), and/or any combination thereof that may be used without an operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that enforces security in a vehicle as further described herein, for example, detects or prevents cyber-attacks on in-vehicle networks. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. Where applicable, the terms "process" and "executable code" may mean the same thing and may be used interchangeably herein. For example, verification, validation and/or authentication of a process may mean verification, validation and/or authentication of executable code.

Storage system 130 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a nonvolatile memory having the storage capacity of storage system 130. Accordingly, although shown as a separate component, storage system 130 may be embedded or included in memory 120.

Input devices 135 may be or may include any suitable input devices, components or systems, e.g., physical sensors such as accelerometers, tachometers, thermometers, microphones, analog to digital converters, etc., a detachable keyboard or keypad, a mouse and the like. Output devices 140 may include one or more (possibly detachable) displays or monitors, motors, servo motors, speakers and/or any other suitable output devices. Any applicable input/output (I/O) devices may be connected to computing device 100 as shown by blocks 135 and 140. For example, a wired or wireless network interface card (NIC), a universal serial bus (USB) device, JTAG interface, CAN controllers, FlexRay controllers, Ethernet controllers, or any other network communication protocol controller, or external hard drive may be included in input devices 135 and/or output devices 140. It will be recognized that any suitable number of input devices 135 and output device 140 may be operatively connected to computing device 100 as shown by blocks 135 and 140. For example, input devices 135 and output devices 140 may be used by a technician or engineer in order to connect to a computing device 100, update software and the like. Input and/or output devices or components 135 and 140 may be adapted to interface or communicate, with control or other units in a vehicle, e.g., input and/or output devices or components 135 and 140 may include ports that enable device 100 to communicate with an engine control unit, a suspension control unit, a traction control and the like.

Embodiments may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 120, computer-executable instructions such as executable code 125 and a controller such as controller 105.

The storage medium may include, but is not limited to, any type of disk including magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device (e.g., automotive ECUs, controllers, etc.), or any other suitable computing device.

In some embodiments, a system may include or may be, for example, a plurality of components that include a respective plurality of central processing units, e.g., a plurality of CPUs as described, a plurality of CPUs embedded in an on board, or in-vehicle, system or network, a plurality of chips, FPGAs or SOCs, microprocessors, transceivers, microcontrollers, a plurality of computer or network devices, any other suitable computing device, and/or any combination thereof. For example, a system as described herein may include one or more devices such as computing device 100.

Figure 2:
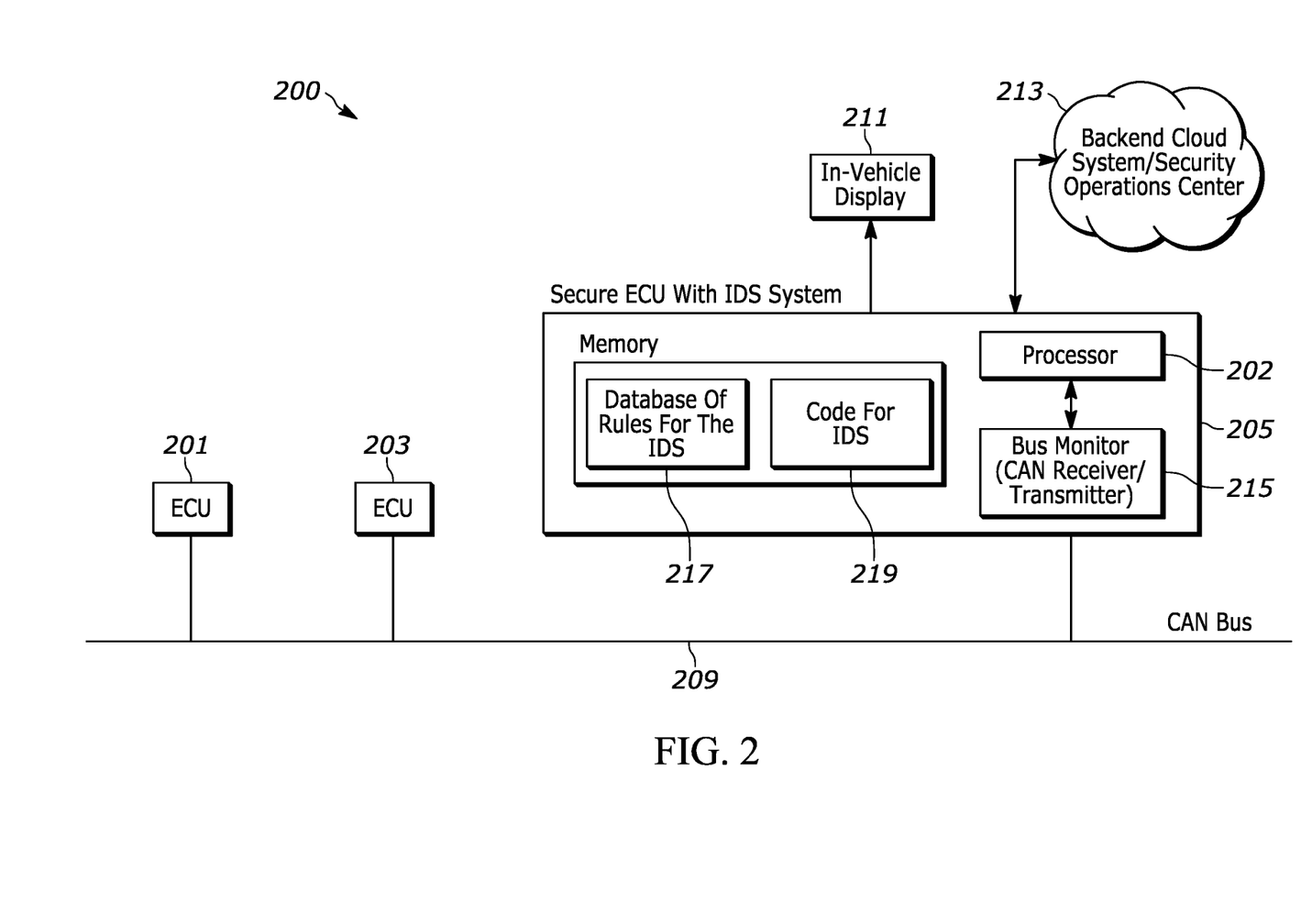
FIG. 2 illustrates an exemplary block diagram of a computing device utilizing a Intrusion Detection System (IDS) and one or more ECUs of a CAN bus.

FIG. 2 illustrates an exemplary block diagram of a computing device an IDS system to monitor one or more ECUs. The circuit 200 may include a first ECU 201, second ECU 203, and an intrusion detections system (IDS) 205, among other things. The circuit may connect each of these components by a CAN bus 209. The CAN bus 209 may be utilized to allow various ECUs or controllers in the vehicle to communicate with one another. The IDS 205 may be utilized to store a fingerprint and/or rule and other secure data related to the system. The fingerprint and/or rules may be used as a profile of the ECU or circuit and be utilized by the IDS to detect malicious behavior. While multiple ECUs are shown in circuit 200, alternative embodiments may include more or less ECUs that are utilized.

In one embodiment, a secure processor 202 or secure ECU or IDS System 205 may be utilized in the IDS system 205. The IDS system may be in communication with an in-vehicle display 211. The IDS system 205 may be configured to send messages and alerts to the display to output messages for one or more occupants of the vehicle to see via the in-vehicle display 211. For instance, the alerts may indicate a potential breach and be displayed on the in-vehicle display 211. The in-vehicle display 211 may be placed at a position where a driver may visually recognize the display panel and display information relate to the vehicle or vehicle environment, among other things. The in-vehicle display 211 may include a multimedia display, odometer display, instrument panel display, rear seat entertainment display, etc.

The IDS system 205 may also be in communication with a remote server 213, also known as a "cloud." The IDS system 205 may utilize a transceiver or mobile communication device to communication with the cloud 213. The cloud 213 may be a backend system or security operations center. The IDS system and the cloud 213 may communication information and data back and forth between each other. The IDS system 205 may be utilized to output an alert or transmit information and data to the backend cloud 213. For example, the IDS system 205 may notify the cloud 213 of a potential breach. Such information can be utilized in the future to prevent future malicious data from causing issues to one or more nodes on the BUS 209.

The IDS system may include memory 215. The memory 215 may be any type of memory, such as any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

The memory 215 may include a database 217. The database 217 may include rules and information for the IDS system to utilize. The memory 215 may also include code 219 utilize for the IDS. The code 219 may be utilized by the processor for multiple causes including operation of ECU functionality, to observe network traffic, estimate status of different nodes on the network, identify packet sequences that may be expected or unexpected in normal operation of the communication bus (e.g., CAN bus), issue alerts, etc. In a rule-based IDS system, a specific pattern of observations may be classified as malicious or an attack based on the rules and information database 217. An attack identified by the IDS may be based on a corresponding rule in the rule-base or the violation of a rule in the rule-base.

The IDS 205 may include a Bus monitor 215. The Bus monitor 215 may be a CAN transceiver, CAN transmitter, CAN receiver, or any combination thereto of a transceiver, transmitter, or receiver. The Bus monitor 215 may be utilized to monitor messages and communication between the CAN Bus 209.

Figure 3:
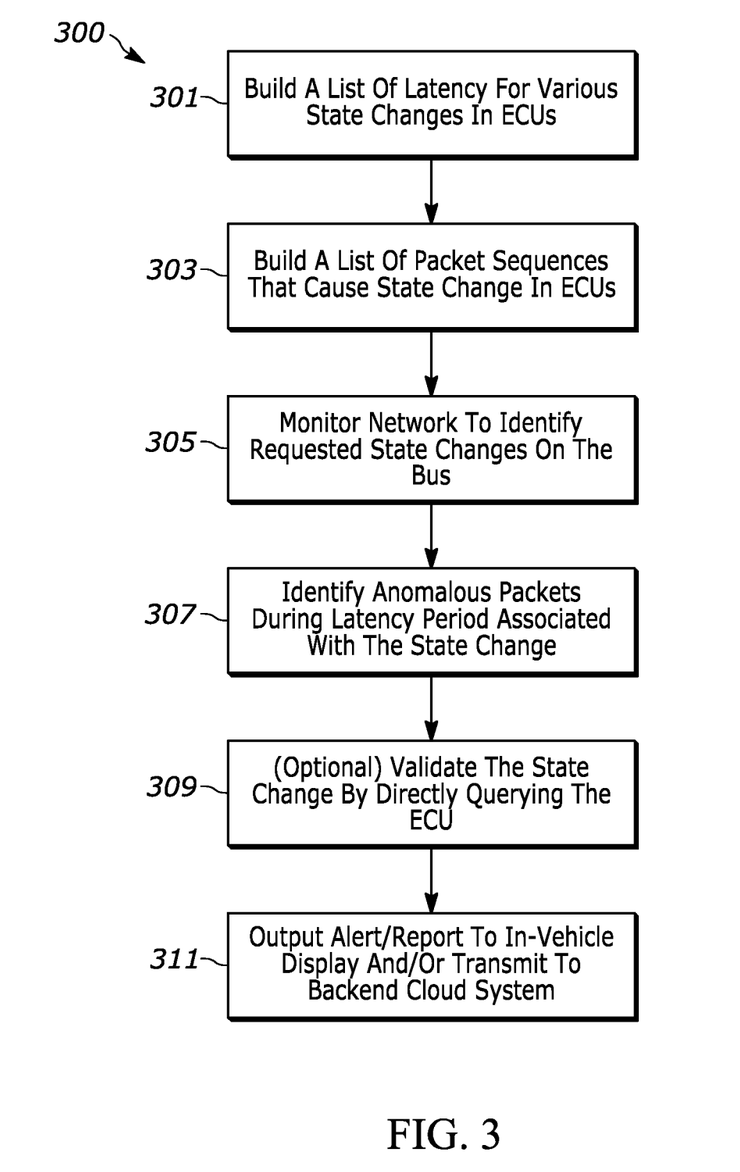
FIG. 3 illustrates a flow chart 300 of a system monitoring latency state changes on a communication bus.

FIG. 3 illustrates a flow chart 300 of a system monitoring the state changes of various nodes on a communication bus. At step 301, a system may have a built list of latency characteristics for various state changes in ECUs of the communication network (e.g., a node). The list may be created by either an experiment of a secure environment or based on manufacturer knowledge. For example, a manufacturer may understand the latency of various states transitions of an ECU and supply an IDS manufacturer with that information to utilize. In one embodiment, a change of an ECU session to initiate a higher privilege state/session (e.g. programming session) may have a certain measurable latency. The ECU may utilize such information to monitor the communication bus and identify anomalous communication. In another example, a reset operation may take a certain amount of time that may depend on various hardware and configuration settings. The IDS may have such information stored in memory for consideration while monitoring of the communication bus.

At step 303, the system may build a list of packet sequences that may cause state changes in the ECUs. The list may be stored in a database or as rules. In one embodiment, the list may be stored locally at an IDS. In another embodiment, the list may be stored remotely at an off-board server. This may include commands to initiate new sessions or a reset. For example, there may be special UDS commands that may be utilized to reset one or more ECUs or nodes.

At step 305, the system may monitor the communication bus to identify requested state changes. In one example, the system may wait for a frame with a reset command to analyze network communication pending such a reset command. The system may then initiate a timer of the duration of the latency of the ECU reset to monitor for abnormal communication during the time period of latency.

At step 307, the system may identify anomalous packets during a latency period associated with the state change. The system may identify such anomalies in response to the communication on the communication bus, as well as utilizing the IDS system (e.g., the Secure processor, and database of rules for the IDS, as well as the code for the IDS). The anomalies may be a variety of situations. In one scenario, the system may identify unexpected packets from the node changing the state. Thus, the messages and packets transmitted may not align with the database of rules. In another embodiment, the system may have packets attempting to trigger rapid state change. Such an embodiment is described below in more detail with respect to FIG. 4. In another embodiment, the system may monitor packets attempting to overwrite state change during a latency period.

At step 309, the system may validate the state change by directly querying the ECU. Such verification may be done by having the IDS transmit a special packet to the ECU and checking the response. For example, the IDS may have specific messages that require a specific response based on the result of the state change. The IDS may utilize such verification to identify if indeed the system transmitted such information.

At step 311, the system may output an alert. The alert may be output to a remote security service (e.g., the cloud) or output locally, such as at a vehicle display or a mobile device within the vehicle. From that standpoint, countermeasures may be implemented to disarm or disable the attack, including system resets, ECU power offs, messages being output, etc.

Figure 4:
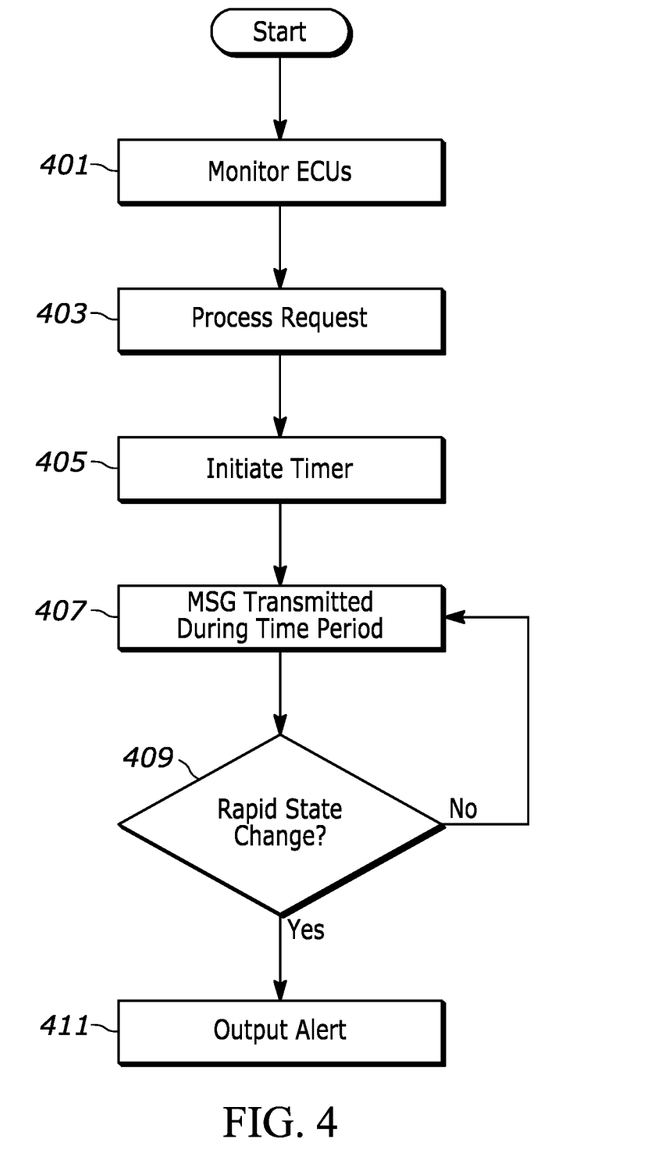
FIG. 4 illustrates an illustrative flow chart of steps to combat an attack that exploits a rapid state change of an ECU.

FIG. 4 illustrates an exemplary flowchart 400 of a scenario related to a rapid request to a state change. In such a method of attack outlined in this example, the attack may utilize unexpected changes in the UDS state for a given ECU. In such an example, an attacker that compromises a single in-vehicle ECU and desires to launch an attack while being monitored to an in-vehicle IDS. With the ability to exploit vulnerabilities in diagnostic state changes, an attacker can spoof messages on the network and transmit messages at unexpected times and context even with the IDS monitoring the network. The initial steps to launch this attack may include that the attacker learns the latency for each ECU and also how the IDS rules work. An attacker with access to a replica of the target vehicle can reverse-engineer the IDS to learn the rules and then find the exploit to the vulnerabilities to attack the network. Several countermeasures can be designed to detect and prevent these attacks. In one embodiment, the system may implement new IDS rules to detect these vulnerabilities and thus propose new software changes to make ECUs less vulnerable to these exploits. Such a vulnerability may result in desynchronization of the state of an ECU and the state estimated by the monitoring IDS system. The secure ECU may be configured or programmed to reject multiple session requests that occur too quickly (e.g., within a time period). In one embodiment, the ECU may produce an error message on the bus when more than one session state change is sent to the ECU (similar to a back-off request or busy request).

A rules-based IDS may typically monitor a variety of parameters for network traffic, including message frequency, content, and context. To better understand how an attacker can avoid detection, rules-based IDS can currently detect attacks via frequency, content, or context. For detection via frequency, a given CAN message identifier is intended to be periodic, however, the IDS may define a specific expected frequency for that identifier along with some allowable variance in that frequency. Also, if a UDS command fails too many times, then the IDS can set a failure threshold that will trigger when a particular command is denied by a given ECU after several attempts (e.g., for security authentication). For detection via content, if a given CAN message contains data that should fall under a specific range, then the IDS will define a specific range for that data and alert if the data is out of bounds. Also, if a UDS command should not exceed a given range (e.g., for setting a testing parameter), then the IDS can also detect an attack that does this. For detection via context, if a given UDS command that can affect the safety of the passengers (e.g., killing engine or brakes) is sent while the vehicle is in motion, then the IDS can alert to a potential attack. The vulnerabilities that that may be detailed below focus on exploiting the context-tracking of a rules-based IDS. If specific network traffic appears on the network while the IDS believes the context is different, then an attacker can exploit context-based rules and succeed in an attack.

With a desynchronized session state between the ECU and IDS, an attacker may try to exploit differences in network rules based on a given session. For example, if the attacker can get the ECU into a default state but make the IDS think the ECU is in the extended diagnostic state, the IDS might permit more types of UDS service requests. In this state, the IDS might ignore messages that are only allowed during extended diagnostic and that originate from an attacker. Also, if the IDS makes the assumption that an ECU will only enter the extended diagnostic state if the vehicle is not in motion (e.g., do this explicitly or from other CAN traffic data that correlates to a given context) or some other context, the IDS could then permit certain commands that should be denied.

If a system reverses the above situation and assumes that there is an attacker that gets the ECU into an extended diagnostic state but makes the IDS think the ECU is in a default state, the IDS might be stricter on network traffic. In such a scenario, the attacker could cause the IDS to think that commands only enabled for extended diagnostic state should be blocked and the IDS could erroneously alert to legitimate messages.

In another example, an attacker ECU may want to cause an erroneous state on. A victim ECU may be controlled by the attacker ECU. The attacker ECU may control and use the victim ECU to inject messages onto the network. Thus, the attacker ECU may inject messages onto the network via the victim ECU. The attacker ECU may wait for the desired context to launch their attack (e.g. vehicle in motion, vehicle being serviced, etc.). Upon the desired context of the attack, the attacker ECU may request multiple session state changes in a row in such a way that the state on the victim ECU is desynchronized from the state that the secure ECU believes that the victim ECU is in. Now that the victim ECU is, for example, in a default state, while the secure ECU may think that the victim ECU is, for example, in an extended diagnostic state, an attack will use the attacker ECU to try to inject messages that are only permitted in the extended diagnostic state. However, the IDS on the Secure ECU may be monitoring network traffic and recognize that the series of session state changes and will decide to confirm what state the victim ECU is in. Further, the Secure ECU may detect the series of session state changes within a threshold time period. The Secure ECU may send a request to the victim ECU and request the current session type. After receiving the response from the victim ECU, the secure ECU may find that the victim ECU is actually in a default state. Given that the attacker ECU could also send a spoofed response back to the Secure ECU as if the victim ECU sent the response. However, since both the attacker ECU and the victim ECU are response in this case, the Secure ECU can easily detect two duplicate responses, alerting to the presence of an attacker.

The attacker ECU may try to launch messages that are only allowed in extended diagnostic state, but since the secure ECU confirmed the state for the victim ECU, the IDS may produce an alert and detects the attacker. The alert may be sent to a remote network or monitoring system in one embodiment. In other embodiments, the alert may trigger countermeasures or continue to monitor the network for messages.

At step 401, the system may monitor the ECU transmissions on the communication bus. The IDS system may monitor the messages utilize the secure processor and various databases that identify the rules for the IDS and codes. The secure ECU may contain the IDS and be configured to monitor network traffic, and in some embodiments, always monitor network traffic. For example, the ECU may be configured to monitor for a certain vehicle scenario, such as that the vehicle is in motion, the vehicle is being serviced, etc. Thus, messages on the CAN bus transmitted between ECUs may indicate such a scenario. In such a scenario, when the desired context is identified, the attacker ECU may request a hard reset to a victim ECU.

At step 403, the system may observe a request from another node or ECU. In such a scenario, the request may include multiple commands to initiate new sessions or to change sessions. However, the IDS system may utilize a timer to initiate a session time period and be aware to monitor for messages containing anomalies or multiple session change requests during the latency period.

At step 405, the system may initiate a timer corresponding to the expected latency of the ECU. In such a scenario, the system may start a timer of duration of a session initiation. The IDS may initiate the time period during a start of the timer to monitor latency. Thus, the messages contained on the bus during the session may be scrutinized. At step 407, the system may receive a message transmitted during the time period initiated.

At step 407, the system may continue to monitor the bus for patterns that may violate the rules in its database. The system may receive multiple session change requests during the period that the latency timer is active. The system would analyze these requests against the database of rules to verify if the requests are valid.

At decision 409, the system may determine if an excess of session state change requests has occurred. The system may wait for a pre-determined threshold of number of violations of valid requests before determining if an excess of session change requests have occurred. In another embodiment, the system may attempt to validate the session change by directly querying the ECU servicing the request and comparing it with its own internal estimated state. A mismatched state indicates a violation has occurred. If the IDS rules of a system are made aware of this vulnerability, the IDS can enforce a minimum time between session state changes. Thus, if the IDS observes too many session state change requests, it can intentionally block requests after an initial request.

At step 411, the system may output an alert if it is determined that an excess of session state changes has occurred. The alert may be notified to users or displays on the communication bus, such as a vehicle display. In another scenario, the message or alert may be output to a cloud server for additional security measures or analyzing.

Figure 5:
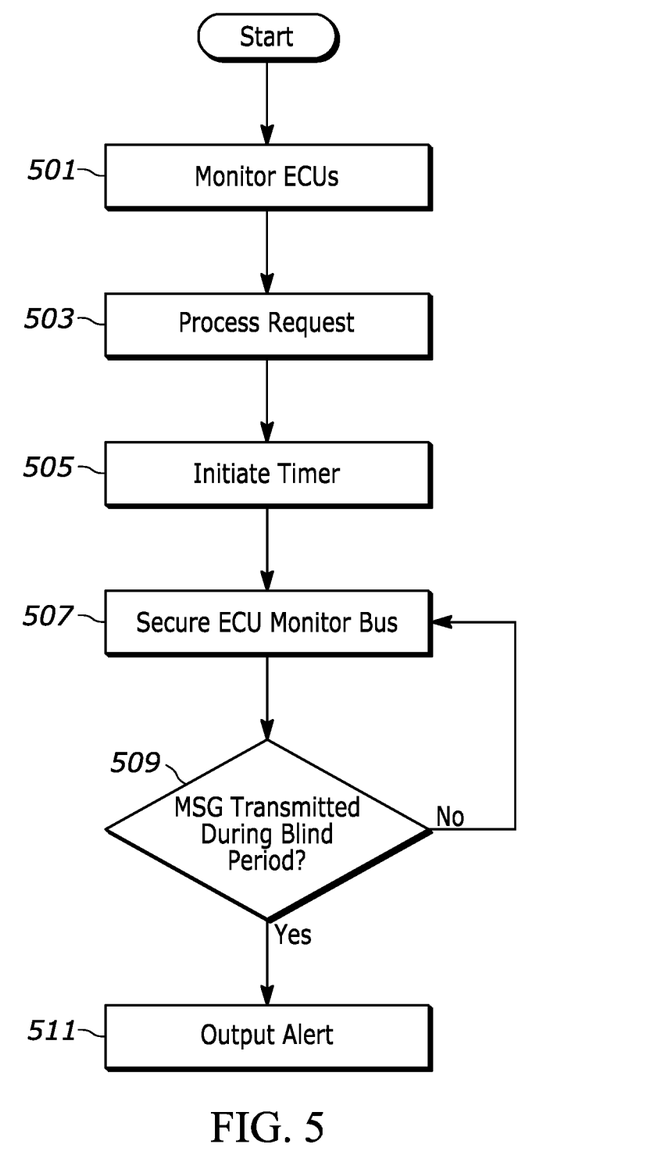
FIG. 5 illustrates an illustrative flow chart of steps to combat an attack that exploits an ECU reset's blind period.

FIG. 5 is an illustrative flow chart of steps to combat an attack that exploits a reset "blind" time. In such a method of attack outlined in this example, the attack may utilize unexpected changes in the UDS state for a given ECU. In such an example, an attacker that compromises a single in-vehicle ECU and desires to launch an attack while being monitored to an in-vehicle IDS. With the ability to exploit vulnerabilities in diagnostic state changes, an attacker can spoof messages on the network and transmit messages at unexpected times and context even with the IDS monitoring the network. The initial steps to launch this attack may include that the attacker learns the blind time for each ECU after a hard reset and also how the IDS rules work. An attacker with access to a replica of the target vehicle can reverse-engineer the IDS to learn the rules and then find the exploit to the vulnerabilities to attack the network. Several countermeasures can be designed to detect and prevent these attacks. In one embodiment, the system may implement new IDS rules to detect these vulnerabilities and thus propose new software changes to make ECUs less vulnerable to these exploits.

In one embodiment, a first vulnerability may occur when an ECU performs specific type of reset. One service in the UDS protocol enables a service technician to request that an ECU perform a reset, and the technician can select the type of reset for the ECU to perform. One type of reset is the hard reset, where the ECU power cycles and mimics an interruption to its power supply. This reset causes both the software and hardware to reset and can be used to correct some ECU issues if used appropriately. However, a hard reset on a given ECU can cause that ECU to lose its ability to observe network traffic. Additionally, a transition to a non-default session state may have a similar impact on an ECU's ability to observe network traffic, although the time that it is blind to traffic is much shorter. This may occur due to an ECU processing the session state transition and loading new programs to handle the new session state. In embodiments disclosed below, the system may address the hard reset approach as it permits a longer blind time for a potential attacker to exploit.

First, some other node in the network may request a given ECU to hard reset. When the given ECU receives this request, it will process it and start the hard reset. The ECU will likely run a single command that performs this hard reset as this is a common feature enabled for many microcontrollers. The hard reset will forcibly shut down all ECU operations and require all software processes to re-initialize.

At the time when the software is shut down for a given ECU, its CAN drivers may no longer function, thus it cannot observe or transmit on the CAN bus. As evidence of this inability to interact with the CAN bus, a hard reset ECU may stop CAN transmissions mid-message and will not respond to diagnostic messages until sometime later. Until a given ECU boots back up and re-initializes its CAN drivers, it still may not observe or transmit on the CAN bus. Since the time between the hard reset and when the CAN drivers are re-initialized varies based on the code that runs in between, the system can expect that the amount of time that a given ECU cannot observe or transmit on the CAN bus to vary between different ECU implementations.

It is clear here that a hard reset causes an ECU to lose the ability to interact with the CAN bus. With this knowledge, several attacks that can exploit this vulnerability may occur. In one example, an attacker that can send diagnostic commands intended for the reset ECU. However, since the reset ECU cannot observe CAN traffic, it cannot respond. However, the attacker can also spoof the response to the command. Without IDS rules for this vulnerability, an attacker could spoof a successful authentication, a change in session state, a successful security check, etc. As long as these commands fall under the other IDS rules, the reset ECU (e.g., victim ECU) cannot do anything to detect that another ECU is spoofing its own messages, opening the vehicle to a significant attack vector.

In one embodiment, during a blind time, an attacker can spoof the entire UDS Security Access service, which is a challenge-response authentication to gain privileged access to a given ECU. In such an embodiment, an attacker can choose any challenge and response pair and simply send a successful authorization response as if the reset ECU granted access. If an IDS is tracking the state of a target ECU, the attacker (e.g., attacker ECU) can trick the IDS into thinking that the target ECU (e.g., victim ECU) has granted privileged access. Depending on the specific implementation, some implications of this attack may include (1) the IDS might initially block (and thus alert) certain commands unless privileged access is acquired but now it can permit those commands, or (2) the IDS might note the privileged access and use it to communicate to a backend service that an authorized device is connected when, in fact, an attacker is connected.

During this blind time, an attacker can spoof a diagnostic session state change. Here, an attacker can transition a given ECU into programming, extended diagnostic or safety diagnostic state and cause the IDS to follow a different set of rules when monitoring network traffic even if the context is different. For example, if a given ECU will only enter the programming state when the vehicle is not in motion, an attacker can hard reset this ECU and spoof a successful transition to the programming state. Thus, the IDS may not be aware that the ECU would have denied the state transition and will now permit messages only permitted during a programming session.

If the ECU designer is made aware of this vulnerability, the ECU designer can declare a static invalid time after a hard reset. The goal here is that the ECU designer can document this blind time and make it common across all ECUs in a vehicle. From experiments on ECUs from different makes and models, the system may find that the blind time varies between automakers. In general, newer ECUs have a longer blind time, which likely correlates with the amount of code that runs on a given ECU. With this implementation, the blind time becomes a known problem and makes it easy for any future IDSes to know that the blind time is expected. Furthermore, by giving this knowledge to the IDS rules, we can ignore messages that originate from the reset ECU during this blind time and produce an alert. The IDS can learn this blind time during a prior configuration or registration phase by testing the ECU in a secure environment. As such, if the IDS is made aware of how long the blind time is for a given ECU, it can know for certain that any messages that claim to originate from the reset ECU must have been spoofed. This approach prevents an attacker from injecting messages during the blind time and thus produces clear evidence of an attack in progress.

To implement a mechanism that a rules-based IDS can implement to detect an attack that exploits the reset "blind" time of a victim ECU, the system may implement the steps addressed below and as shown in FIG. 5. In such a scenario, one ECU may be identifies as a "victim" ECU that the attacker wants to hard reset and to spoof. Another ECU may be an "attacker" ECU that the attacker controls and may use to inject messages onto the network. In another scenario, another ECU may be a "secure" ECU that contains the IDS and is configured to monitor network traffic of the vehicle network (e.g., vehicle CAN bus).

At step 501, the attacker ECU may monitor the vehicle environment by reading messages on the vehicle bus to wait for a desired context of the vehicle environment to launch an attack. For example, the ECU may be configured to monitor for a certain vehicle scenario, such as that the vehicle is in motion, the vehicle is being serviced, etc. Thus, messages on the CAN bus transmitted between ECUs may indicate such a scenario. In such a scenario, when the desired context is identified, the attacker ECU may request a hard reset to a victim ECU.

At step 503, the system may observe a request on the bus to activate the reset functionality of another node or ECU. The victim ECU may lose its ability to interact with the bus for a time period during the reset, for example, some period of milliseconds, nanoseconds, etc. However, during this period, at step 505, the system (secure ECU) may initiate a timer corresponding to the latency of the ECU reset stored in the system database.

At step 507, the secure ECU may observe the bus and monitor the messages during the active timer. The system may observe messages spoofed messages from the ECU servicing the reset request. Thus, for a time period during the blind period, at decision 509 the system may determine whether the messages were sent during the blind period from the victim ECU or the ECU that was set. The system may conclude the occurrence of a violation only if the number of spoofed messages exceeds a determined threshold. If no violations recorded during the period the timer was active, the secure ECU may continue to monitor the messages on the bus. If a violation occurred, the system may product an alert that an attacker is detected from step 511. The alert may be output to a remote security service (e.g., the cloud) or output locally. From that standpoint, countermeasures may be implemented to disarm or disable the attack, including system rests, ECU power offs, messages being output, etc. The blind period may vary in various circumstances based on a vehicle environment or situation. For example, the blind period may be different when driving versus a parked vehicle, or when the ignition is off.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system comprising:
    memory;
    a database including information indicating one or more latency values associated with a change of a state associated with one or more nodes on a communication bus, wherein the database further includes information indicative one or more messages configured to change the state of the one or more nodes and a list of packet sequences that cause state changes in the ECUs, wherein the latency values indicate latency of various state transition;
    a secure processor in communication with the memory and programmed to:
        monitor the one or more messages from a first node of the one or more modes on the communication bus, wherein the one or more messages include a request to a state change of the one or more nodes;
        in response to the one or more messages including the request to the state change, initiate a timer to initiate monitoring of the communication bus for a second sequence of messages in a pre-defined time period;
        determine whether the second sequence of messages are transmitted during a blind period; and
        in response to the second sequence of messages not aligned with the database indicating packet information associated with one or more latency values associated with the change of the state and an unexpected packet sequence during the blind period, output a signal indicating an alert, and output the alert without analyzing contents of the second sequence of messages.

2. The system of claim 1, wherein both the secure processor and the one or more nodes are on the communication bus.

3. The system of claim 1, wherein the secure processor is programmed to receive the one or more message from a victim processor in response to commands sent from an attacker processor to the victim processor.

4. The system of claim 1, wherein the signal indicating the alert is output to a remote cloud processing center.

5. The system of claim 1, wherein the secure processor is configured to transmit signals to query the state of the one or more nodes.

6. The system of claim 1, wherein the secure processor is configured to transmit signals to remove one or more unexpected messages from the bus.

7. The system of claim 1, wherein the database including information indicating latency values includes information containing one or more values to process a reset message by a second processor, wherein the database indicating packet information contains the sequence to trigger the state change in the second processor.

8. The system of claim 7, wherein the secure processor receives from a third processor a message indicating to reset the second processor, and initiates a time of a duration of a reset latency, and receives a message from the bus belonging to the second processor before expiration of the timer, and in response, issue an alert to a vehicle user.

9. The system of claim 1, wherein the database including information indicating one or more latency values further includes information indicating a value to process a session change request by a second processor or the database indicating packet information includes a sequence to trigger the state change in the processor.

10. The system of claim 9, wherein the secure processor receives, from a third processor, a request to change session from the second processor and initiates a time of a duration of an expected latency associated with the request; and the secure processor receives a second message from the third processor to change the session of the second processor before expiration of the timer and outputs an alert to a vehicle user.

11. The system of claim 10, wherein the secure processor receives multiple message from the third processor, and in response to receiving the multiple messages sends a request to the second processor to determine the state of the second processor, wherein the secure processor is further configured to monitor one or more bus messages in response to the determination of the state of the second processor.

12. A computer-implement method, comprising:
receiving one or more messages at a processor from a first node on a communication bus;
monitoring the one or more messages from the first node, wherein the one or more messages include a request to change the state of the one or more nodes;
in response to the one or more messages including the request to change the state, initiating a timer to initiate monitoring of the communication bus for a second sequence of messages in a pre-defined time period; and
in response to the second sequence of messages not being found within the database including information associated with the one or more latency values associated with the change of state nodes and a list of packet sequences that cause state changes in the ECUs, wherein the latency values indicate latency of various state transition, outputting a signal indicating an alert, wherein the alert is output without analyzing contents of the second sequence of messages.

13. The computer-implemented method of claim 12, wherein the alert is output to a vehicle display.

14. The computer-implemented method of claim 12, wherein the processor is further configured to send a validation request to the one or more nodes in response to the second sequence of messages.

15. A system comprising:
a secure processor in communication with memory on a communication bus and programmed to:
receive one or more messages at a secure processor from a first node on a communication bus;
monitor the one or more messages from the first node, wherein the one or more messages include a request to change a state of the one or more nodes;
in response to the one or more messages including the request to change the state, monitor the communication bus for a second sequence of messages in a pre-defined time period; and
in response to the second sequence of messages not being aligned with packet information associated with the request to change the state of the one or more nodes, output a signal indicating an alert, wherein the packet information associated with the request to the change the state of the one or more nodes is located in the database stored in memory, and output the alert without analyzing contents of second sequence of messages.

16. The system of claim 15, wherein the secure processor is further programmed to alert a second processor, wherein the second processor is programed to adjust communication parameters in response to the alert.

17. The system of claim 15, wherein the secure processor is further programmed to output the alert to a cloud server.

* * * * *